Patented Oct. 19, 1948

2,451,955

UNITED STATES PATENT OFFICE 2,451,955

COMPOSITION FOR POISON IVY DIAGNOSIS

Harry Keil and Charles R. Dawson, New York, and David Wasserman, Brooklyn, N. Y.

No Drawing. Application September 20, 1945, Serial No. 617,672

12 Claims. (Cl. 167—58)

This invention relates to tetrahydrourushiol as an agent in the treatment of dermatitis such as that resulting from contact with poison ivy and related plants, and more particularly to a diagnostic means to determine the sensitivity of individuals to such dermatitis, comprising tetrahydrourushiol dissolved in a carrier such as an organic solvent, preferably a volatile solvent such as acetone, or dispersed in an emulsion medium.

"Urushiol" has long been recognized as the substance present in Japanese lacquer responsible for the dermatitis suffered by workers in lacquer plants and craftsmen applying Japanese lacquer. This material, as is well known, is an exudate from the Japanese lac tree (Rhus vernicifera).

More recently it has been shown that constituents substantially identical with "urushiol" are probably the major toxic factors of American poison ivy (Rhus toxicodendron), as well as of poison oak (Rhus diversiloba), and of poison sumach (Rhus venenata).

Efforts have been made to meet the hazard of poison ivy dermatitis by prophylactic intramuscular injections of extracts of the plant. Success has been reported in some cases, but the results are so far neither sufficiently consistent nor sufficiently long-lasting to be altogether satisfactory.

One of the difficulties in using poison ivy extracts in this way has been the lack of a method of standardization, the extracts varying in properties to some degree with their age, the conditions of preparation, the plant source, and other factors.

The synthetic duplication of urushiol itself, which appears to be the active constituent of these extracts, of course offers an attractive possibility of standardization. The chemical constitution of urushiol has, however, not been completely determined, and consequently its duplication has still to be accomplished. Urushiol is known to consist chiefly of a vicinal derivative or mixture of derivatives of pyrocatechol (1,2-benzenediol) with unsaturated straight chains of 15 carbon atoms in the number 3 position. The uncertainty in the structure of these compounds lies in lack of knowledge as to the location of the double bonds in the long-chain alkyl substituents and the degree of their unsaturation. The formula, as far as known, may be represented by the following:

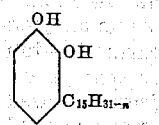

Poison ivy urushiol where "$n$" may be 2, 4 or 6. Small amounts of the corresponding saturated compound "tetrahydrourushiol" ($n=0$) have also been reported present in "urushiol."

The oil of cashew nut shells (Anarcardium occidentale) also produces irritation in the skin of sensitive individuals. This oil contains a dihydric phenol, cardol, similar to the constituents of "urushiol" but derived from resorcinol (1,3-benzenediol) instead of from pyrocatechol. Its constitution is represented by:

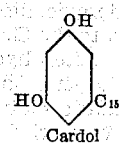

Cardol

The physiological effects of cardol appear similar to those of urushiol.

The established formula of tetrahydrourushiol is:

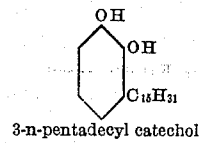

3-n-pentadecyl catechol

We have now made the surprising discovery that synthetic tetrahydrourushiol reacts on the human system in a manner strikingly similar to that of the unsaturated plant products, particularly urushiol, described above. More unexpected is the fact that tetrahydrourushiol has, to a high degree, the same specificity as respects individual subjects as have these unsaturated products, particularly urushiol.

While tetrahydrourushiol with a 15 carbon side chain in the 3 position has yielded optimum results in this work, analogous compounds with saturated side chains in the 3 position of somewhat different length, e. g. in the range of 10 to 18 carbons, have similar properties.

We have, in fact, carried out clinical experiments in which we have compared the sensitivity of a considerable number of persons to poison ivy extract and to tetrahydrourushiol by the skin-patch-test method and found a substantial parallelism. These tests are described in greater detail below.

Synthesis of tetrahydrourushiol

Tetrahydrourushiol (3-n-pentadecyl catechol) has been synthesized by the following series of steps:

Step 1.

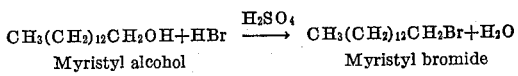

Myristyl alcohol        Myristyl bromide 500 g. of myristyl alcohol was refluxed for four hours with 745 g. of 48% aqueous hydrobromic acid, and 234 g. of concentrated sulfuric acid. The cooled mixture was diluted with water, separated, washed, dried, filtered and distilled at 165–167° C., 11 mm. pressure to yield 504 g. (78%) of myristyl bromide.

Step 2.

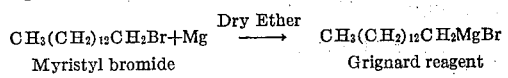

Myristyl bromide        Grignard reagent

To 10.95 g. of magnesium turnings in 150 cc. of dry ether was added a crystal of iodine and then slowly 125 g. of myristyl bromide dissolved in 150 cc. of dry ether. The reaction was completed in two hours to yield myristyl magnesium bromide.

Step 3.

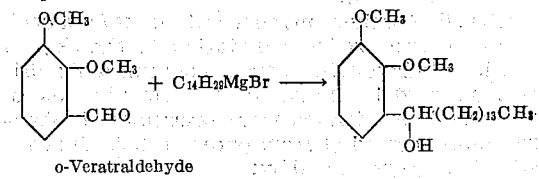

o-Veratraldehyde 49.8 g. of o-veratraldehyde dissolved in 100 cc. of dry ether was added to the Grignard product in step 2 with cooling. After hydrolysis with 400 cc. of 2 N sulfuric acid, the ether layer was separated, washed with dilute sodium carbonate and then with water. It was dried with sodium sulfate, filtered, the ether removed, the residue dissolved in 400 cc. of warm ethanol, cooled, and octacosane filtered off as a white solid.

Step 4.

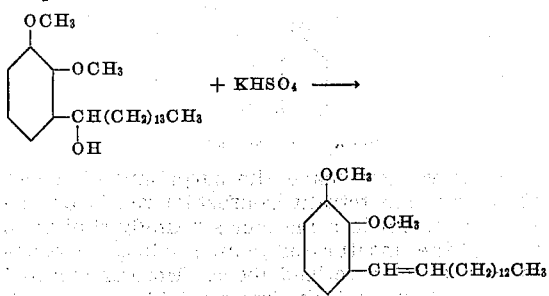

The alcoholic solution of the secondary alcohol, resulting from reaction in step 3, was heated to distill off all the ethanol, and the residue was heated with 6 g. of fused potassium bisulphate in powder form at 150–210° C. for forty minutes. Upon filtration of this mixture and subsequent vacuum distillation at 2 mm., 84.4 g. (81%) of colorless liquid having a bluish fluorescence was obtained at 200–209° C.

Step 5.

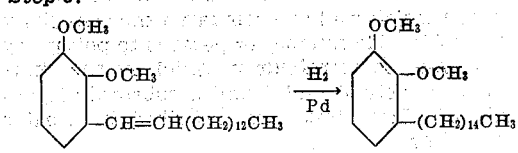

40 g. of the unsaturated compound, 3-n-pentadecenyl-1'-veratrole, was reduced with hydrogen at two atmospheres in the presence of 1 g. of palladium oxide catalyst and 100 cc. of thiophene free benzene. After one recrystallization from ethanol, 37 g. (92%) of white solid 3-n-penta- decyl veratrole, M. P. =36.5–37.5° C., was obtained.

Step 6.

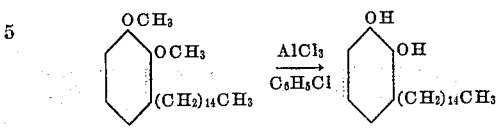

3 g. of 3-n-pentadecyl veratrole, 3 g. of aluminum chloride (anhyd.) and 30 cc. of dry chlorbenzene were refluxed 3 hours, cooled, poured on ice, washed with 50% methanol solution, and the chlorbenzene layer evaporated under vacuum. The residue on molecular distillation yielded 2.5 g. of crude catechol compound which, after three recrystallizations from petroleum ether, yielded 2.1 g. (76%) of pure 3-n-pentadecyl catechol melting at 59–60° C.

It will be seen from the above reactions that tetrahydrourushiol is the saturated analog of the unsaturated urushiol compounds and differs from the latter only in that the side-chain double bonds have been saturated with hydrogen.

Clinical tests

A group of 50 unselected persons, of which only one was suffering from active poison ivy dermititis at the time of testing, were given patch tests with (a) ground poison ivy leaves or extract or both and (b) tetrahydrourushiol and other related derivatives of catechol applied in the concentration of 1% in acetone. Twenty-nine subjects gave negative responses to patch tests with ground poison ivy leaves or extract or both, and also gave negative tests to tetrahydrourushiol and related catechol derivatives. The remaining 21 subjects gave positive reactions to the ground poison ivy leaves or extract or both, and all these persons also showed positive responses to the 1% solution of tetrahydrourushiol in acetone.

There thus appeared to be in this group a complete parallelism in sensitivity and lack of sensitivity between poison ivy leaves or poison ivy extract and tetrahydrourushiol.

This experiment was confirmed by further and more detailed tests on 21 selected persons all sensitive to Rhus toxicodendron. This latter group contained 10 cases showing active or receding lesions of poison ivy dermatitis at the time of testing. Of these 21 persons, 20 showed positive patch tests to the ground poison ivy leaves or to an extract (19 to the former, 1 to the latter); the remaining case, which was not tested with either of these two materials, had ben observed previously in an attack of poison ivy dermatitis and, at the time of testing, had returned with a fresh recurrence of the condition in typical form. All subjects gave positive patch tests to synthetic 3-n-pentadecyl catechol in concentrations of 1% in acetone or less. Adding these data to those previously reported, it will be seen that 42 persons sensitive to the poison ivy plant, as shown by the patch test, were all likewise sensitive to synthetic 3-n-pentadecyl catechol.

An analysis of the data obtained in the second set of tests showed that a 1% acetone solution of tetrahydrourushiol elicited fairly intense reactions in 11 subjects, which exceeded the reactions exhibited by the same subjects to ground poison ivy leaves. Comparing the initial responses at 48 hours, a concentration of 0.1% 3-n-pentadecyl catechol (14 subjects) showed more pronounced reactions than the poison ivy leaves in 6 persons, about the same in 2, and less intense in 6. In those instances in which the responses could be observed in 96 hours, the majority of reactions to this concentration of 3-n-pentadecyl catechol became more pronounced. Using a concentration of 0.01% 3-n-pentadecyl catechol (21 subjects), all except one case exhibited definite positive reactions; however, in some cases the responses were truly delayed until 72 to 96 hours. In the case of 0.001% 3-n-pentadecyl catechol (21 subjects), only 7 showed unequivocal positive responses and almost half were delayed to the third or fourth day. Only 3 persons in 21 tested with 0.0001% 3-n-pentadecyl catechol showed positive reactions; these responses were mild and were delayed in 2 of the 3 cases.

These data indicate that a concentration of 0.1% 3-n-pentadecyl catechol in acetone represents generally the optimal strength or testing in order to avoid unduly severe reactions; however, an observation period of 96 hours is requisite for final evaluation. Although it is possible that the use of a somewhat higher concentration (say 0.5%) might eliminate a number of the delayed responses, it should be pointed out that there were instances in which patients showed a delayed reaction to even higher concentrations. Thus all the patch sites in one patient were negative at 48 hours, including a site treated with 1% 3-n-pentadecyl catechol, whereas intensely positive reactions appeared at 60 hours. It is possible, also, that the use of 0.1% concentration may in rare cases fail to detect the mildly sensitive person. For example, in an additional group of 20 instances showing positive responses to 1% 3-n-pentadecyl catechol, we encountered one exceptional case in which the reaction to 0.1% concentration was doubtfully positive. Thus, among 41 subjects exhibiting positive reactions to 1% 3-n-pentadecyl catechol, only 1 failed to show a definitely positive response to a 0.1% concentration of this substance.

In the tests described above we have used acetone as the solvent-carrier. We have also obtained good results using iso-amyl acetate, which is less volatile than acetone, and in which tetrahydrourushiol is soluble. Other solvents that may be used are methanol, ethanol and propylene glycol. In fact, any solvent for tetrahydrourushiol which is non-irritating to the patient and has the desired volatility may be used.

Not only may tetrahydrourushiol be used in solution, it may also be effectively used in colloidal suspension, for example emulsified in an aqueous soap solution.

It will be seen from these two sets of tests that tetrahydrourushiol is a desirable diagnostic aid in determining sensitivity to poison ivy. Being a synthesizable compound of known composition, it may serve as a primary standard for diagnostic and other therapeutic procedures; furthermore, being a saturated compound and less subject to deterioration on storage and use than plant extracts, its stability greatly facilitates its use as a standard.

We claim:

1. As a therapeutic agent, a synthetic vicinal alkyl pyrocatechol having 10 to 18 carbon atoms in the alkyl group, and a carrier.

2. As a diagnostic agent, between about 0.001% and about 1% synthetic tetrahydrourushiol uniformly distributed in a carrier of a non-irritant organic solvent.

3. As a therapeutic agent, a solution of about 0.001% to about 1% synthetic tetrahydrourushiol in a non-irritating organic solvent.

4. As a diagnostic agent adapted to determine human sensitivity to urushiol dermatitis, an acetone solution containing between about 0.01% to about 1% of dissolved synthetic tetrahydrourushiol.

5. As a diagnostic agent, between about 0.001% and about 1% synthetic tetrahydrourushiol uniformly distributed in a carrier of a non-irritant aqueous emulsion medium.

6. As a diagnostic agent adapted to determine human sensitivity to urushiol dermatitis, an alcoholic solution containing between about 0.01% to about 1% of dissolved synthetic tetrahydrourushiol.

7. As a diagnostic agent adapted to determine human sensitivity to urushiol dermatitis, an iso-amyl acetate solution containing between about 0.01% to about 1% of dissolved synthetic tetrahydrourushiol.

8. As a diagnostic agent adapted to determine human sensitivity to urushiol dermatitis, a standardized solution of from about 0.001% to about 1% of a synthetic vicinal alkyl pyrocatechol having 10 to 18 carbon atoms in the alkyl group, in a non-irritant organic solvent, the saturated pyrocatechol derivative being the only pyrocatechol compound present.

9. As a diagnostic agent adapted to determine human sensitivity to urushiol dermatitis, a standardized solution of from about 0.001% to about 1% of synthetic tetrahydrourushiol in a non-irritant organic solvent, the tetrahydrourushiol being the only pyrocatechol compound present.

10. A diagnostic agent as set forth in claim 8, in which the solvent is acetone.

11. A diagnostic agent as set forth in claim 8, in which the solvent is an alcoholic solvent.

12. A diagnostic agent as set forth in claim 8, in which the solvent is iso-amyl acetate.

HARRY KEIL.
CHARLES R. DAWSON.
DAVID WASSERMAN.

REFERENCES CITED

The following references are of record in the file of this patent:

UNITED STATES PATENTS

| Number | Name | Date |
| --- | --- | --- |
| 1,559,340 | Masucci | Oct. 27, 1925 |

OTHER REFERENCES

U. S. Dispensatory, 23rd ed., 1943, pages 1498 and 1499.

New & Nonofficial Remedies, 1944, pages 56 to 59.

Science, May 18, 1945, pages 517 and 518, article by Sizer et al.

Technology Review, July 1945, pages 557, 558, 610, 612, 614, by Sizer et al.

Toxic Principle of Poison Ivy by Hill et al., J. A. C. S., 1934, pages 2736 to 2738.

Chem. Abs., vol. 32, 1938, col. 9285—article by H. A. Foerster.

Keil J. Allergy—vol. 15, May 1944, page 259.